INVENTOR.
FRANCIS T. OGAWA
BY
George E. Bodenstein
AGENT.

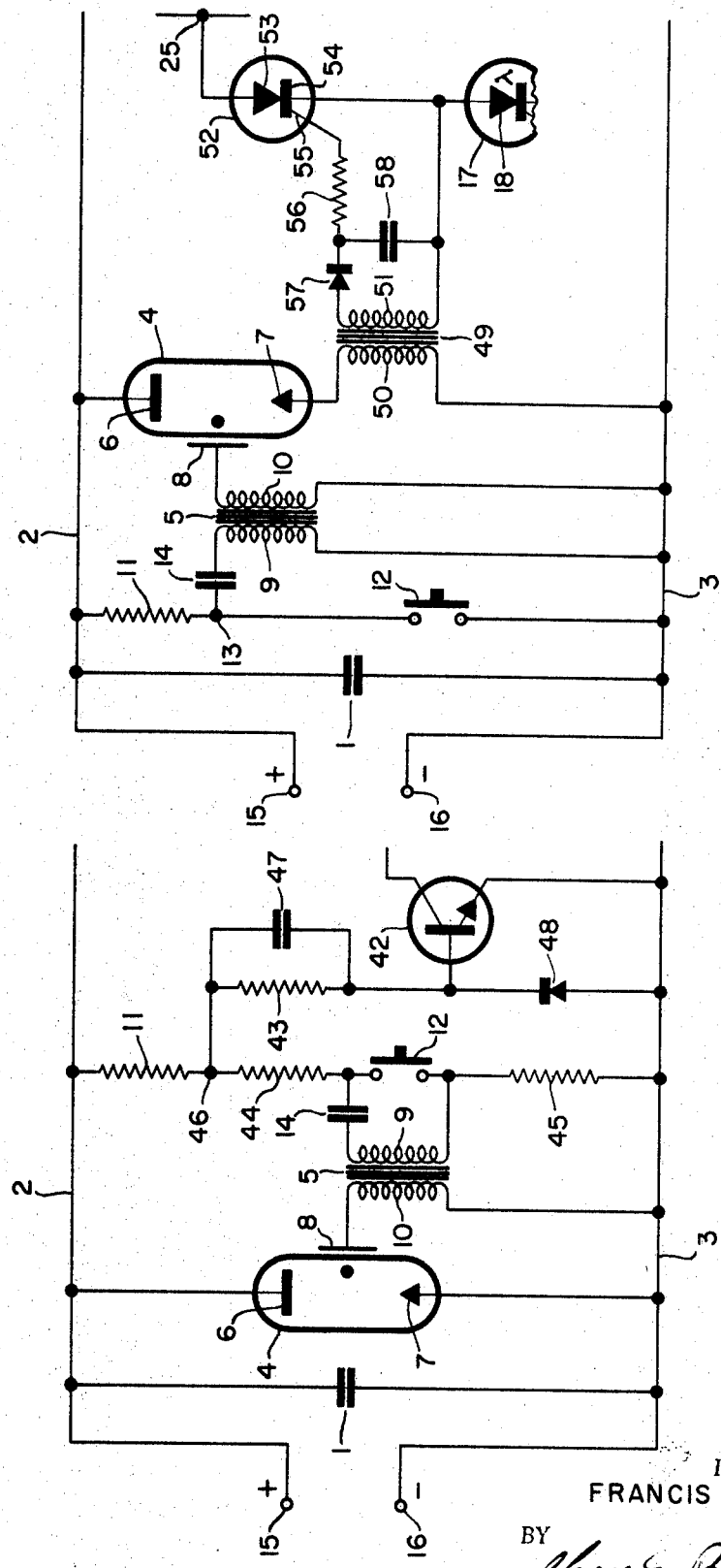

United States Patent Office 3,519,879
Patented July 7, 1970

3,519,879
FLASH APPARATUS WITH AUTOMATIC LIGHT TERMINATION HAVING GATING AND ANTICIPATION MEANS
Francis T. Ogawa, Denver, Colo., assignor to Honeywell, Inc., Minneapolis, Minn., a corporation of Delaware
Filed July 25, 1968, Ser. No. 747,714
Int. Cl. G01j 1/32; H05b 37/02, 41/38
U.S. Cl. 315—151                            14 Claims

ABSTRACT OF THE DISCLOSURE

A circuit, including a light activated silicon controlled rectifier having a capacitor and a resistor in series between its gate and cathode electrodes, is normally disabled by a semiconductor gating switch controlled by a voltage in the firing means for the flash tube of the apparatus. Firing of the flash tube actuates the switch and enables the circuit, which then produces across the resistor-capacitor combination a voltage proportional to both the intensity and the total quantity of light received by the rectifier. When this voltage rises to a predetermined value, it turns on the rectifier. This produces a trigger pulse which fires a quench tube to quench the flash tube, after which the switch again disables the circuit.

---

Figure 1:
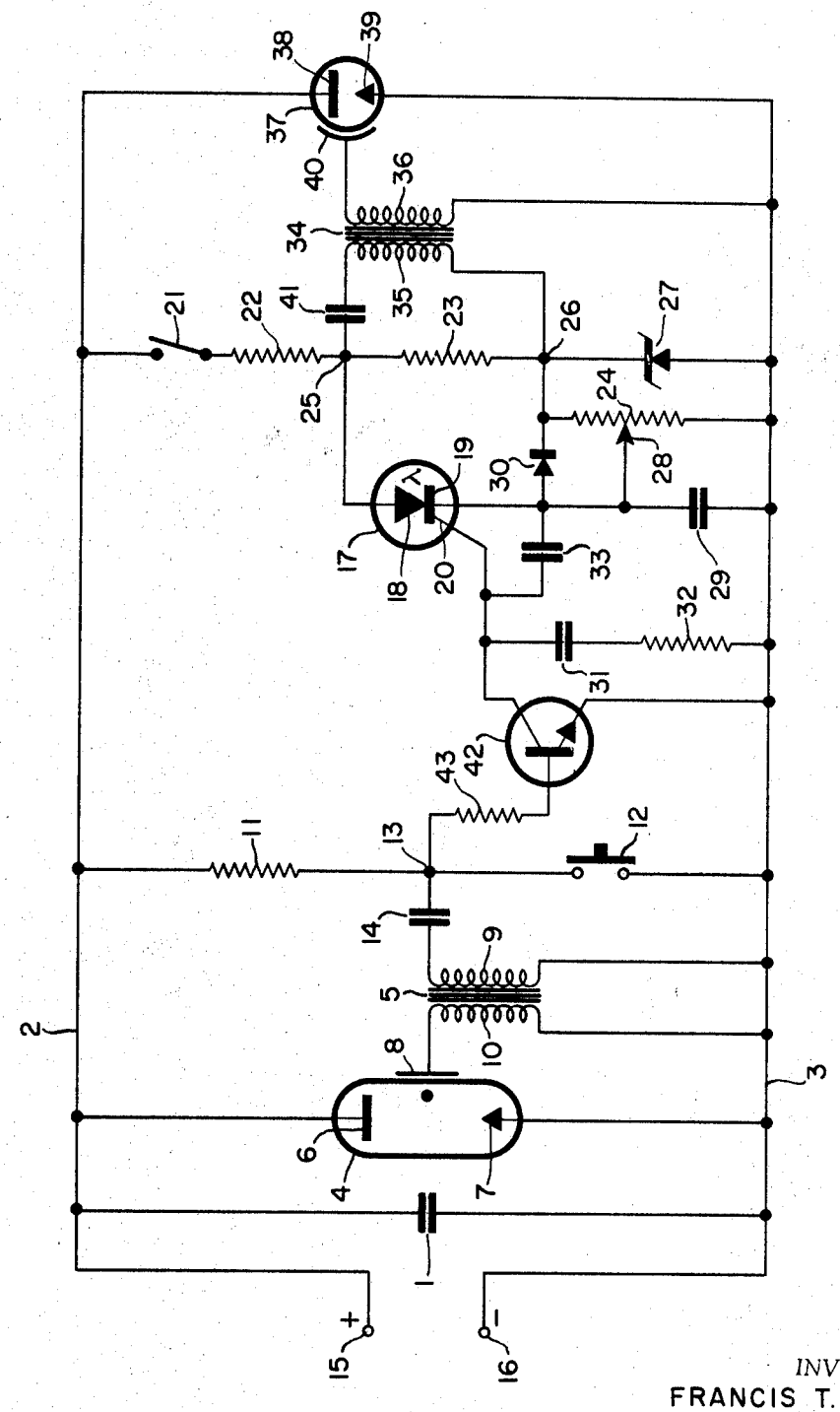

Subject matter disclosed but not claimed herein is disclosed and claimed in the copending application of Jerry B. Hoffer, Francis T. Ogawa, and Robert H. Wallace Ser. No. 747,628 filed July 25, 1968.

Electronic photographic flash devices are known in the art in which the flash produced by the flash tube of the device is automatically terminated after a predetermined total quantity of light has been received from the photographed scene or subject by a light responsive control portion of the device. This is done with the intention of causing the quantity of light reaching the film of the associated camera, during each exposure, to be independent of the distance, hereinafter referred to as the camera to subject distance, which lies between the location of the camera and flash apparatus and the location of the subject.

Devices of the above type are shown, for example, in United States Pats. No. 3,340,426, No. 3,350,603, and No. 3,350,604. While such devices have been generally satisfactory, there has still existed a need for improved apparatus of this type wherein the actuation of the light terminating means is effected even more accurately and more reliably, under varying conditions, than it has been in the previously known devices.

Specifically, there has existed a need for improved automatic flash apparatus having greater accuracy, that is, apparatus wherein precisely the same total quantity of light from a subject is caused to reach the camera film irrespective of the camera to subject distance. It has been the tendency of the previously known devices to provide excessive amounts of light when the camera to subject distances are small.

Additionally, there has existed a need for improved automatic flash apparatus having greater reliability, specifically, apparatus in which the light terminating means is prevented from being actuated by extraneous conditions or events, and is enabled only when it properly should be, that is, when the flash tube of the apparatus itself has been fired. The previously known devices have often exhibited deficiencies in this respect.

Therefore, it is an object of the present invention to provide improved flash apparatus which fulfills the foregoing needs for apparatus of greater operating accuracy and reliability. It is a specific object of the invention to provide such improved apparatus which operates with increased accuracy by consistently providing precisely the same quantity of light to the associated camera for camera to subject distances over a wide range. It is a more specific object of the invention to provide such improved apparatus which operates with such increased accuracy by compensating for the variable quantities of light which have been found to be produced for different camera to subject distances, during time delays inherent in the apparatus, as a result of the non-linear nature of the flash tube light.

Another specific object of the invention is to provide such improved apparatus in which the reliability of operation is increased by preventing the untimely operation of the light controlling means, that is, by preventing the light terminating function from being initiated by noise, the flashing of other flash apparatus, and other extraneous causes. An even more specific object of the invention is to provide such apparatus wherein the firing of the flash device of the apparatus is the sole condition which enables the apparatus, that is, which permits it to initiate the operation of the light controlling means.

In accomplishing these and other equally desirable objects, the improved flash apparatus provided in accordance with the present invention includes novel anticipation means and novel gating means, in addition to the usual light responsive integrating means for providing an integration voltage representative of the total quantity of received light, and the usual means for terminating the light when the integration voltage reaches a predetermined value. Said anticipation means causes the terminating means to be actuated at such times as to effect the above-mentioned compensation for the variable nature of the light produced during the noted time delays. To accomplish this, the anticipation means provides an effect, such as a voltage, which represents the intensity of the received light. This anticipation voltage is added to the integration voltage to form the voltage which causes the actuation of the light terminating means when this voltage reaches a predetermined value. The anticipation means may be a resistor which is supplied with a current proportional to light intensity, which current is also applied to a capacitor to produce the integration voltage.

Said gating means provides the above-mentioned prevention of the untimely operation of the light terminating means. To accomplish this, the gating means normally disables the sensing and integrating means, and enables this means only upon the occurrence of a voltage change in the flash tube firing means representative of the firing of the flash tube. This gating means may be a semiconductor switch which is controlled by said firing means voltage change. In one form of apparatus according to the present invention, this switch may be a transistor which is normally turned on, to short-circuit the integrating capacitor, and which is temporarily turned off by said voltage change which results from the firing of the flash tube. In another form, said switch may be a normally non-conductive silicon controlled rectifier which is connected in series with the sensing means, and which is turned on by the voltage change which results from the flow of current which occurs in the flash tube circuit when the flash tube is producing light.

A better understanding of the present invention may be had from the following detailed description when read in connection with the accompanying drawings, wherein:

FIG. 1 is a schematic circuit diagram of improved flash apparatus according to the present invention; and FIGS. 2 and 3 are schematic circuit diagrams of modified portions of the apparatus of FIG. 1.

Referring to FIG. 1 of the drawings, the illustrated and described flash apparatus is one which includes the conventional type of electronic flash tube and firing circuit therefor, together with a novel light responsive control portion. The purpose of this control portion is to automatically terminate the light, by terminating the production of light by said tube, when a predetermined quantity of light has been received back by the apparatus from the subject being photographed. Thus, the apparatus is one which automatically controls the duration of the flash produced by the flash tube as necessary to cause a predetermined quantity of light from the illuminated subject to fall on the film of an associated camera, not shown, for each exposure. The illustrated apparatus includes the usual flash storage capacitor 1, which is connected between conductors 2 and 3, and includes the usual flash tube 4 and trigger transformer 5. The flash tube 4 has main electrodes 6 and 7 which are connected, respectively, to the conductors 2 and 3, and has a trigger electrode 8. The transformer 5 has a primary winding 9 and a secondary winding 10.

A resistor 11 and a normally open firing switch 12 are connected in series between the conductors 2 and 3, and have a common junction 13. The switch 12 is representative of the usual camera shutter flash contacts and/or open flash or test switch of the flash apparatus. The winding 9 is connected in series with a trigger capacitor 14 between the junction 13 and the conductor 3, and hence across the switch 12. The winding 10 is connected between the electrode 8 and the conductor 3. The conductors 2 and 3 are provided with respective terminals 15 and 16 for connecting these conductors, and hence the capacitor 1, to the usual capacitor charging means, not shown. As shown, conductor 2 is positive with respect to conductor 3.

The construction and operation of the apparatus as thus far described are those of a typical electronic flash device, of the type shown and described in United States Pat. No. 3,049,611, for example. It is therefore sufficient to note herein, with respect to such operation, that the capacitor 1 is normally maintained in a charged state by the aforementioned capacitor charging means, whereby a relatively high voltage is normally maintained between the conductors 2 and 3. The capacitor 14 also is normally maintained charged, by virtue of its connection to the conductors 2 and 3 through the resistor 11 and winding 9.

When the flash tube 4 is to be fired, the switch 12 is closed. This dumps the charge on the capacitor 14 across the winding 9, with the result that a trigger pulse is applied between the electrodes 8 and 7. This fires the tube 4 and causes it to conduct and to emit light. In the absence of the automatic control portion of the apparatus, to be described hereinafter, the tube 4 will continue to emit light until, due to the conduction of the tube 4, the charge on the capacitor 1, and the voltage between the conductors 2 and 3, drop sufficiently to cause the tube 4 to be extinguished. Thereafter, the capacitors 1 and 14 are recharged to be ready for the next firing of the tube 4.

The novel control portion of the apparatus includes a light activated silicon controlled rectifier (LASCR) 17 which is arranged to be exposed to light coming from the scene which is to be illuminated by the flash tube and which is to be photographed. The LASCR 17 has an anode 18, a cathode 19, and a gate 20. An energizing circuit for the LASCR 17 consists of a power switch 21 and resistors 22, 23, and 24 connected in series between the conductors 2 and 3. Specifically, this series circuit extends from the conductor 2 and through the switch 21 and the resistor 22 to a junction 25, then through the resistor 23 to a junction 26, and then through the resistor 24 to the conductor 3. A Zener diode 27 is connected from the junction 26 to the conductor 3, and hence is connected across the resistor 24.

The LASCR anode 18 is connected to the junction 25, while the cathode 19 is connected to a sliding contact 28 which is adjustable along the resistor 24. Thus, the anode-cathode path of the LASCR 17 is effectively energized from across the series combination of the resistor 23 and that portion of the resistor 24 which lies above the contact 28. A capacitor 29 is connected between the contact 28 and the conductor 3. A diode 30 is connected between the cathode 19 and the junction 26 to effectively connect said anode-cathode path across the resistor 23.

An integrating capacitor 31 and an anticipation resistor 32 are connected in series between the LASCR gate 20 and the conductor 3, whereby the capacitor 31, the resistor 32, and the portion of the resistor 24 below the contact 28 are connected in series between the gate 20 and the cathode 19. The resistor 32 provides an important anticipation action which will be described hereinafter. A capacitor 33 is connected directly between the gate 20 and the cathode 19.

Said control portion also includes a quench trigger transformer 34 having a primary winding 35 and a secondary winding 36, and includes a quench tube 37 having main electrodes 38 and 39 and a trigger electrode 40. The tube 37 may well be of the type described in the three patents first mentioned herein. The winding 35 is connected in series with a trigger capacitor 41 between the junctions 25 and 26, whereby this winding and capacitor are connected in series across the resistor 23 and a charge is normally maintained on the capacitor 41. The winding 36 is connected between the electrode 40 and the conductor 3. The electrodes 38 and 39 are connected, respectively, to the conductors 2 and 3, whereby the quench tube 37 is directly connected in parallel with the flash tube 4 between the conductors 2 and 3.

A gating means, as referred to hereinbefore, is included in the FIG. 1 apparatus in the form of an NPN transistor 42 having the usual collector, emitter, and base. The primary purpose of this means, as explained hereinbefore, is to prevent the untimely operation of the control portion including the LASCR 17. This is accomplished in accordance with the present invention by arranging the transistor 42 so that it normally disables the circuit including the LASCR 17, and so that it enables this circuit only upon the firing of the flash tube 4.

To this end, the collector of the transistor 42 is connected to the upper side of the capacitor 31, while the transistor emitter is connected to the conductor 3. This places the collector-emitter path of the transistor 42 across the capacitor 31 and resistor 32. The transistor base is connected through a resistor 43 to the junction 13, whereby the base-emitter or control path of the transistor is connected in series with the resistors 11 and 43 between the conductors 2 and 3. The latter constitute points between which a significant voltage change occurs upon the firing of the flash tube 4, since the conduction of the tube 4 reduces the charge on the capacitor 1, and the voltage between the conductors 2 and 3, as explained hereinbefore.

The foregoing connections also connect the base-emitter path of the transistor 42 in series with the resistor 43 between the junction 13 and the conductor 3, and hence across the switch 12. The junction 13 and the conductor 3 likewise constitute points between which a significant voltage change occurs upon the firing of the flash tube 4, due to the short-circuiting action produced by the closure of the switch 12 which effects this firing.

From the foregoing, it is clear that the control path of the transistor 42 is connected between points between which a significant change in voltage occurs which is related to the firing of the tube 4.

The apparatus which has been described operates in the following manner. Let it be assumed that the capacitor 1 has its normal operating charge, and that the apparatus is thus in condition to fire the flash tube 4 upon the closure of the switch 12. At this time, the tubes 4 and 37, and the LASCR 17, are not conducting. Also at this time, the voltage between the conductors 2 and 3 produces such a base bias on the gating transistor 42 that the latter is turned on, causing its collector-emitter path effectively to short-circuit the capacitor 31 and resistor 32. The gate 20 of the LASCR 17 is thus effectively clamped to the cathode 19, neglecting the voltage drop across the capacitor 29, and the LASCR 17 is held off or non-conductive, and hence is disabled. As a result, the LASCR 17 and the quench tube 37 are prevented from being actuated or affected by extraneous causes, which could otherwise prematurely fire the quench tube 37 and thus prevent the proper operation of the apparatus upon the subsequent firing of the flash tube 4.

When the switch 12 is subsequently closed, thereby firing the flash tube 4, the voltage between the junction 13 and the conductor 3 drops to zero, thereby removing the aforementioned base bias from the transistor 42. This turns off the transistor, causing the gate 20 of the LASCR 17 to be unclamped, and enabling the latter. The following reopening of the switch 12, which usually occurs almost at once, does not cause the gate 20 to be clamped again, however, since the conduction of the tube 4 will have by then so reduced the charge on the capacitor 1, and the voltage between the conductors 2 and 3, that there will then be insufficient base bias on the transistor 42 to turn it on to effect such clamping. Also, the voltage between the junction 13 and the conductor 3 will then be reduced, due to the voltage drop across the resistor 11 which will result from the charging current for the capacitor 14 which will flow at that time.

Coincident with the foregoing action, the LASCR 17 will start to receive light from the scene as a result of the operation of the flash tube 4. This light falls on the photo-sensitive junction of the LASCR 17 and causes the latter to generate a photo current which is proportional to the intensity of the incident light. This current flows through the integrating capacitor 31 and the anticipation resistor 32. With respect to the capacitor 31, this current is a charging current, and produces a charge on, and an integration voltage $V_i$ across, the capacitor 31 in accordance with the equation:

$$V_i = \frac{1}{C}\int i\,dt$$

where C is the capacitance of the capacitor 31, and $i$ is the photo current generated in the LASCR 17.

In other words, the charge and voltage on the capacitor 31 are proportional to the integral of the intensity of the light incident on the LASCR 17 from the time of the turning off of the transistor 42.

The aforementioned flow of the photo current through the anticiptation resistor 32 produces across the latter an anticipation voltage $V_a$ of a magnitude which is proportional to said incident light intensity, and which can be expressed by the equation:

$$V_a = iR$$

where R is the resistance of the resistor 32. The practical importance of this anticipation voltage will be discussed in more detail hereinafter.

Due to the above-described connections of the capacitor 31 and the resistor 32, the sum of the integration voltage and the anticipation voltage effectively appears as a control voltage between the gate 20 and the cathode 19 of the LASCR 17, in series with the voltage across the lower portion of the resistor 24 and across the capacitor 29. This latter voltage is an adjustable bias voltage which determines at what value of said control voltage the following switching of the LASCR 17 occurs.

As the light continues to fall on the LASCR 17, said control voltage increases according to the above equations until the gate trigger voltage of the LASCR 17 is exceeded. When this occurs, the LASCR 17 is turned on and switches to a conductive state. This causes the anode-cathode path of the LASCR to effectively short-circuit the resistor 23 and to dump the charge on the capacitor 41 across the winding 35 of the quench trigger transformer 34. This in turn causes a light-terminating trigger pulse to be applied between the electrodes 40 and 39 of the quench tube 37. This fires the latter, causing it to effectively short-circuit the flash tube 4 and terminate the production of light by the latter.

The aforementioned dumping of the capacitor charge across the winding 35 produces a ringing action, which back-biases the LASCR 17 and positively turns it off once it has caused the trigger pulse to be produced. Thus, the LASCR 17 is returned to its normal, non-conductive state, ready for the next flash-controlling operation.

Subsequent to the quenching of the flash tube 4, the voltage between the conductors 2 and 3 rises sufficiently, as the capacitor 1 is recharged, to return the turn-on base bias to the transistor 42. Therefore, subsequent to the production of the trigger pulse, the transistor 42 is again turned on, whereby it again disables the LASCR 17. This operation of the transistor 42 also desirably discharges the capacitor 31, and thus readies it for the next integrating operation.

The purpose of the switch 21 is to permit the automatic light controlling action to be entirely suspended when such suspension is desired. The purpose of the capacitor 33, which is connected directly across the gate-cathode junction of the LASCR 17, is to reduce the tendency of the LASCR 17 to be triggered into conduction by noise. The capacitor 33 also serves to increase the maximum value of anode voltage rate of change which the LASCR 17 can tolerate without being turned on thereby.

As previously noted, the voltage across the lower portion of the resistor 24, appearing across the capacitor 29, is an adjustable bias voltage whose value determines the value of the control voltage which will turn on the LASCR 17. The value of this bias voltage is determined by the adjusted position of the contact 28. This voltage is held constant, when once set, by the storage action of the capacitor 29, and by the action of the Zener diode 27, which maintains the voltage across the resistor 24 constant for all voltages between the conductors 2 and 3 above a predetermined minimum value.

A previously noted also, the diode 30 effectively connects the anode-cathode path of the LASCR 17 across the resistor 23. This diode is normally back biased. As soon as the LASCR 17 becomes conductive, the diode 30 becomes forward biased, and completes the circuit including the LASCR 17 which causes the capacitor 41 to discharge into the trigger transformer winding 35.

The time at which the above-noted quenching of the flash tube 4 and termination of the light occur should, of course, be the time at which a desired total quantity of light has reached the associated camera film. Further, this light quantity should remain constant from exposure to exposure, irrespective of the camera to subject distance, once the apparatus has been set for the desired quantity. Such desired operation is, in fact, provided by the herein-described apparatus, in accordance with the present invention, as will now be shown in detail.

As previously noted herein, it has been the tendency of the prior automatic flash devices to provide excessive amounts of light for short camera to subject distances, such as distances of the order of two feet, for example. In other words, a given calibration or setting which causes such devices to produce the desired total quantity of light on the film for longer distances causes the devices to produce excessive quantities of light on the film for shorter distances. I have discovered that this deficiency results from a combination of two effects, one of which is an inherent time delay in such apparatus, and the other of which is the non-linearity of the flash tube light output with time.

Specifically, a finite time elapses between the instant that the light responsive means, such as the LASCR 17, has received sufficient light to be switched on, and the instant at which the light is actually terminated. During this fixed time delay, the apparatus continues to produce light which reaches the subject and the film. It is also a fact that the flash tube light builds up to a peak intensity very rapidly upon the firing of the flash tube, whereafter the intensity of the produced light drops off approximately exponentially at a much slower rate. As a result of the foregoing, the amount of light produced during said time delay is not a constant, but has widely different values depending upon the time in the flash tube operating cycle at which said time delay occurs.

In connection with this explanation, it must be borne in mind that short camera to subject distances require only relatively small amounts of light from the flash tube to produce the desired quantity of light on the film, whereas longer camera to subject distances require larger amounts of light from the flash tube to produce the same desired quantity of light on the film. Accordingly, the flash tube is necessarily quenched early in its cycle for said short distances, and later in its cycle for said longer distances.

As a result, for said short distances, the aforementioned time delay occurs early in the flash tube cycle, when the rate of change of light intensity is high. Conversely, for said longer distances, said time delay occurs later in the flash tube cycle, when the rate of change of light intensity is lower. Therefore, during said time delay, considerably greater quantities of light are produced for said short distances than are produced for said longer distances.

The total quantity of light reaching the film from the flash apparatus for any given exposure is, of course, made up of two parts. The first of these is the initial quantity, which is the quantity of light produced up to the time of the switching of the light responsive means. The second is the time delay quantity, which is the quantity of light produced during said ensuing time delay. In the prior devices, which were not provided with any anticipation means, such switching always occurred, from exposure to exposure, each time that the same initial quantity of light had reached the light responsive means. Thus, the total quantity of light on the film for said short distances consisted of this fixed initial quantity plus a relatively large time delay quantity, while the total quantity of light to the film for said longer distances consisted of the same initial quantity plus a relatively small time delay quantity. This is the reason that, in the prior devices, a setting which produced the desired total quantity of light on the film for longer distances resulted in the production of excessive quantities of film light for shorter distances.

By the use of the aforementioned anticipation voltage produced by the anticipation resistor 32, the apparatus according to the present invention maintains the total quantity of light reaching the film constant, notwithstanding the production during said time delays of larger quantities of light for shorter camera to subject distances. Specifically, the invention apparatus causes the sum of the initial and time delay quantities of light to be the same from exposure to exposure, irrespective of the variation of the time delay quantity with distance.

The apparatus does the foregoing by providing the anticipation voltage, by making this voltage proportional to the intensity of the incident light, and by adding this voltage to the integration voltage to form the control voltage for the LASCR 17. Thus, for said short distances, where the light intensity, and hence the anticipation voltage, are rapidly increasing, the control voltage is built up to the trigger value at a suitably fast rate to compensate for the accompanying larger quantities of time delay light. The effect of this is that the control voltage attains the trigger value for smaller integration voltages at said short distances. The result is that the initial quantities of light are kept smaller for said short distances to compensate for the larger time delay quantities then produced. Conversely, the initial light quantities are permitted to be larger for said longer distances, at which the light intensity changes more slowly and the time delay quantities are smaller. In this way, the total quantity of light reaching the film is maintained constant from exposure to exposure over a wide range of distances. It is apparent that the actual magnitude of this quantity is determined or set by the adjusted position of the contact 28 on the resistor 24, which contact therefore provides a calibration adjustment.

It is believed that the foregoing makes it clear that the desired operation noted hereinbefore is, in fact, provided by the disclosed apparatus, in accordance with the present invention.

The modified apparatus portion illustrated in FIG. 2 includes connections for firing the flash tube 4 and for controlling the gating transistor 42 which are somewhat different from those included in the FIG. 1 apparatus. In FIG. 2, components which are the same as those in FIG. 1 have been given the same reference numerals as those of their FIG. 1 counterparts. The unillustrated remainder of the FIG. 2 apparatus is assumed to be the same as the corresponding portion of the FIG. 1 apparatus.

The firing switch circuit of the FIG. 2 apparatus includes, in addition to the switch 12 and the resistor 11 of FIG. 1, resistors 44 and 45. These elements are connected in a series circuit which extends from the conductor 2 through the resistor 11 to a junction 46, and then through the resistor 44, the switch 12, and the resistor 45 to the conductor 3. The capacitor 14 and the winding 9 are connected in series across the switch 12 as before. The transistor base is connected through the resistor 43 to the junction 46, and a capacitor 47 is connected in parallel with the resistor 43. The transistor base is connected through a diode 48 to the conductor 3. The diode 48 serves to protect the transistor 42, and to complete a circuit through the combination of the resistor 43 and the capacitor 47.

The FIG. 2 apparatus operates in the following manner. Prior to the closure of the switch 12, the voltage between the junction 46 and the conductor 3 biases the transistor 42 into the on condition. When the switch 12 is subsequently closed, the charge on the capacitor 14 is dumped across the winding 9, thereby firing the flash tube 4. The closure of the switch 12 also causes the voltage between the junction 46 and the conductor 3 to drop, which turns off the transistor 42. The capacitor 47 imparts a snap action to this turning off of the transistor. The following reopening of the switch 12 does not turn on the transistor again, for the same reasons stated in connection with the FIG. 1 apparatus.

Subsequent to the quenching of the flash tube 4, the voltage between the conductors 2 and 3 rises sufficiently to return the turn-on base bias to the transistor 42, as in the case of the FIG. 1 apparatus.

The modified apparatus portion illustrated in FIG. 3 includes a gating means which is different from the transistor switch included in the apparatus of FIGS. 1 and 2. In FIG. 3, components which are the same as those in FIGS. 1 and 2 have been given the same reference numerals as their FIG. 1 and FIG. 2 counterparts. The unillustrated remainder of the FIG. 3 apparatus is assumed to be the same as the corresponding portion of the FIG. 1 apparatus, although the gating means of FIG. 3 is useful for controlling light responsive circuits including means other than a LASCR.

The firing circuit of the FIG. 3 apparatus is essentially the same as that of FIG. 1, except that the FIG. 3 firing circuit includes a transformer 49 having a primary winding 50 and a secondary winding 51. The winding 50 is connected between the flash tube electrode 7 and the conductor 3, whereby the winding 50 is connected in series with the flash tube 4 between the conductors 2 and 3.

The gating circuit of FIG. 3 includes a silicon controlled rectifier (SCR) 52 having an anode 53, a cathode 54, and a gate 55. The anode 53 is connected to the supply junction 25, and the anode 18 of the LASCR 17, which was connected directly to the junction 25 in the FIG. 1 apparatus, is now connected to the SCR cathode 54. As a result, the gating SCR 52 is connected between the anode 18 of the LASCR 17 and the junction 25.

The gate 55 of the SCR 52 is connected through a resistor 56 and a rectifier diode 57 to one end of the transformer winding 51. The other end of the latter is connected to the SCR cathode 54. A filter capacitor 58 is connected across the series combination of the diode 57 and the winding 51. Thus, the gate-cathode junction of the SCR 52 is connected across the output of a filtered rectifier circuit which is energized from the transformer winding 51.

The operation of the FIG. 3 apparatus is as follows. Prior to the closure of the switch 12, the flash tube 4 is not conducting, whereby no current flows through the winding 50. As a result, there is no voltage produced across the winding 51, and no voltage applied to the gate-cathode junction of the SCR 52. Accordingly, the latter is turned off, whereby the LASCR 17 is disabled.

The subsequent closure of the switch 12 fires the flash tube 4. The large discharge current which then flows through the tube 4 also flows through the winding 50. This current induces a voltage pulse across the winding 51 which is rectified by the diode 57, filtered by the capacitor 58, and applied to the gate-cathode junction of the SCR 52. As a result, the latter is turned on, thereby enabling the LASCR 17. The ends of the winding 51 are thus points between which a significant change in voltage occurs which is related to the firing of the tube 4, and which enables the LASCR 17.

The time constant of the capacitor 58 and the resistor 56 is chosen to keep the SCR 52 conducting for the duration of the flash. Subsequent to the termination of the flash, the SCR 52 is turned off and the LASCR 17 is once again disabled. Accordingly, the SCR 52 performs a gating operation which is similar to that performed by the transistor 42 of the arrangements of FIGS. 1 and 2.

It should be appreciated that the gating and anticipation arrangements according to the present invention can be used advantageously with light responsive, flash controlling circuitry other than the particular circuit disclosed herein employing an LASCR. It should also be appreciated that said arrangements are applicable to light controlling apparatus for flash devices other than electronic flash tubes, such as flash bulb apparatus equipped with means for terminating the flash light by interrupting its passage from the device in response to a trigger pulse. Examples of such apparatus are the arrangements disclosed in the copending applications of W. H. Owens, Ser. No. 700,998, and D. G. Taylor, Ser. No. 704,597.

Further, it should be appreciated that said arrangements can be used advantageously with flash apparatus wherein pulse-actuated terminating means terminates the light by interrupting its passage to the photographic film, as by the use of a shutter, instead of by stopping the production of the light by the flash device or by interrupting the passage of the light from the flash device.

In conclusion, it is seen that the improved apparatus according to the present invention, by virtue of the use of the gating means and the anticipation means, provides operation which is characterized by a high degree of reliability and accuracy.

The embodiments of the invention in which an exclusive property or privilege is claimed are defined as follows:

1. In apparatus including a flash device and means for firing the latter to cause it to produce light, the improved light responsive control means for controlling said light comprising:

light sensitive circuit means arranged for exposure to said light to produce a terminating signal when said circuit means has been exposed to a predetermined total quantity of light, gating means having a connection to said firing means at points between which a significant change in voltage occurs which is related to the firing of said flash device, and having a connection to said circuit means, said gating means being responsive to the voltage between said points to normally disable said circuit means to block it from producing said signal notwithstanding the quantity of light to which said circuit means has been exposed, and to enable and hence unblock said circuit means temporarily in response to said voltage change, and terminating means connected to said circuit means to terminate said light in response to the production of said signal.

2. Apparatus as specified in claim 1, wherein:

said circuit means includes a silicon controlled rectifier which is made conductive, to cause the production of said signal, when said circuit means has been exposed to said predetermined quantity of light, and wherein:

said gating means includes a transistor which is connected to said rectifier to normally prevent the latter from being made conductive, and hence to provide said normal disabling of said circuit means, and which is included in said connection to said firing means and is responsive to said voltage change therein to permit said rectifier to be made conductive and thereby to provide said temporary enabling of said circuit means.

3. Apparatus as specified in claim 1, wherein said circuit means includes:

a silicon controlled rectifier having anode, cathode, and gate electrodes, a signal circuit including said anode and cathode electrodes which produces said signal when said rectifier is made conductive, said rectifier becoming conductive upon the application between said cathode and gate electrodes of a predetermined voltage, and connections for applying said predetermined voltage between said cathode and gate electrodes when said circuit means has been exposed to said predetermined total quantity of light, said gating means includes a transistor having a collector-emitter path connected between said cathode and gate electrodes which clamps the potential of said gate electrode to that of said cathode electrode when said transistor is conductive, and which permits a voltage to exist between said gate and cathode electrodes when said transistor is not conductive, and wherein said connection to said firing means normally maintains said transistor conductive and renders said transistor temporarily non-conductive upon the occurrence of said voltage change in said firing circuit.

4. Apparatus as specified in claim 1, wherein:

said firing means includes a firing circuit connected across a source of energizing voltage, said firing circuit including resistance means and a switch connected in series and including said points to cause the voltage therebetween to change upon the closure of said switch, and wherein said apparatus includes connections between said series circuit and said flash device to cause said closure of said switch to fire said flash device.

5. Apparatus as specified in claim 4, wherein:

said gating means includes a transistor having emitter, collector, and base electrodes, said connection of said firing means to said gating means includes connections between said base and emitter electrodes and said points, and wherein said connection of said gating means to said circuit means includes connections between said emitter and collector electrodes and said circuit means.

6. Apparatus as specified in claim 5, wherein said base and emitter electrode connections effectively connect said base and emitter electrodes across said switch to cause said transistor to be biased to a conductive state, to effect said disabling of said circuit means, when said switch is open, and to cause said transistor to be non-conductive, to effect said enabling of said circuit means, when said switch is closed.

7. Apparatus as specified in claim 6, wherein said switch, when closed, effectively short-circuits said base and emitter electrodes.

8. Apparatus as specified in claim 1, wherein:
said firing means includes supply conductors between which a voltage is provided,
said flash device includes an electronic flash tube connected between said conductors, the flashing of said flash tube causing the voltage between said conductors to drop significantly, and wherein
said voltage between said points to which said gating means is responsive is derived from the voltage between said conductors.

9. Apparatus as specified in claim 1, wherein:
said firing means includes supply conductors between which a voltage is provided and includes a circuit connecting said flash device and a current responsive device in series between said conductors, and wherein said points are connected to said current responsive device to cause the firing of said flash device to produce said voltage change between said points.

10. In apparatus including a flash device and means for firing the latter to cause it to produce light, the improved light responsive control means for controlling said light comprising light sensitive circuit means including:
light responsive integrating means arranged for exposure to said light to produce an integration signal of a magnitude representative of the integral of the intensity of the light to which said responsive means is exposed,
anticipation means connected to said responsive means to produce an anticipation signal of a magnitude representative of said light intensity, and
signal responsive means responsive to the magnitude of the sum of said two signals to produce a terminating signal when the last-mentioned magnitude reaches a predetermined value, and
terminating means connected to said circuit means to terminate said light in response to the production of said terminating signal.

11. Apparatus as specified in claim 10, wherein:
said light responsive means produces a current which is proportional to said light intensity and which is applied to said anticipation means,
said integration signal is a voltage which is proportional to the integral of said current, and wherein
said anticipation signal is a voltage which is proportional to said current.

12. Apparatus as specified in claim 11, wherein:
said light responsive means includes a light responsive device for producing said current and a capacitor connected to said light responsive device to cause said current to flow through said capacitor,
said anticipation means includes a resistor connected in series with said capacitor, and wherein
said signal responsive means is connected across, and is responsive to the voltage across, the series combination of said capacitor and said resistor.

13. Apparatus as specified in claim 10, wherein said control means includes gating means connected to said light sensitive circuit means to normally disable said circuit means to block it from producing said terminating signal notwithstanding the quantity of light to which said light responsive means has been exposed, and arranged to enable and unblock said circuit means temporarily in response to the firing of said flash device.

14. Apparatus as specified in claim 13, wherein said gating means includes a connection to said firing means at points between which a significant change in voltage occurs which is related to said firing of said flash device, and is responsive to the voltage between said points to effect said normal disabling of said circuit means, and to effect said enabling of said circuit means in response to said voltage change.

References Cited

UNITED STATES PATENTS

| | | | |
|---|---|---|---|
| 3,033,988 | 5/1962 | Edgerton | 315—151 X |
| 3,340,426 | 9/1967 | Elliott | 315—151 |
| 3,350,603 | 10/1967 | Erickson | 315—157 X |

JAMES W. LAWRENCE, Primary Examiner

C. R. CAMPBELL, Assistant Examiner

U.S. Cl. X.R.

250—205; 315—157, 183, 230, 241